United States Patent [19]

Cameron-Johnson

[11] 3,722,894
[45] Mar. 27, 1973

[54] SEALING GLAND WITH UNSTRESSED STANDBY SEAL

[75] Inventor: Alan Cameron-Johnson, St. Albans, England

[73] Assignee: Hawker Siddeley Aviation Limited, Kingston-upon-Thames, Surrey, England

[22] Filed: Mar. 3, 1971

[21] Appl. No.: 120,460

[30] Foreign Application Priority Data

Mar. 6, 1970 Great Britain.....................10,888/70

[52] U.S. Cl.............................................277/9, 277/11
[51] Int. Cl. ................................................F16j 9/00
[58] Field of Search...............................277/1, 9, 11

[56] References Cited

UNITED STATES PATENTS

| | | |
|---|---|---|
| 3,514,114 | 5/1970 | Monahan..............................277/9 X |
| 3,096,985 | 7/1963 | Biheller..................................277/9 |
| 3,186,720 | 1/1965 | Miller et al. ........................277/9 X |
| 2,917,330 | 12/1959 | Vanta....................................277/9 |
| 2,853,321 | 9/1958 | Davey....................................277/9 |
| 3,129,948 | 4/1964 | Kendall.............................277/64 X |
| 3,604,098 | 9/1971 | Goldberg...........................277/9 X |

Primary Examiner—Meyer Perlin
Assistant Examiner—Ronald C. Capossela
Attorney—Rose & Edell

[57] ABSTRACT

A sealing gland assembly for an aircraft undercarriage leg in which, in addition to the primary or working seal ring, a standby seal ring is stored in an unstressed condition on the 'wet' side of the working seal ring. Both seal rings are contained within a seal chamber formed by an enlargement at the end of the outer tube of a sliding telescopic pair of tubes, the open end of the enlargement being substantially closed by a gland ring that has an axial flange extending into the seal chamber and compressing the working seal, but not the standby seal, against the inner tube.

8 Claims, 1 Drawing Figure

Patented March 27, 1973
3,722,894
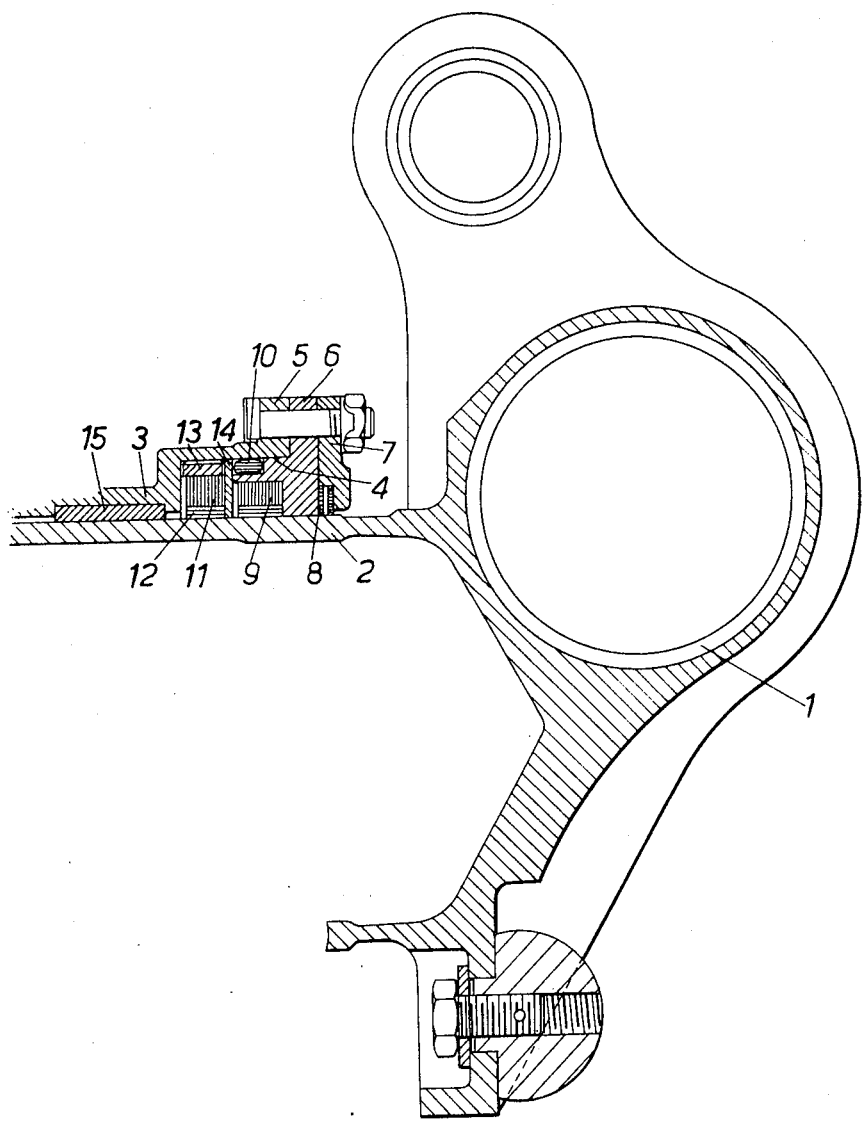
Inventor
ALAN CAMERON JOHNSON
By
Rose + Edell   Attorneys

SEALING GLAND WITH UNSTRESSED STANDBY SEAL

This invention relates to aircraft undercarriage legs and like hydraulic units. More particularly, it is concerned with the provision of standby sealing glands for such units.

The current emphasis on reliability and minimum down time of aircraft hydraulic and undercarriage equipment has necessitated the provision of in situ replacement or standby seals which can be put into operation with minimum dismantling and during a quick turnaround.

One known arrangement employs two seals within the unit in a primary and secondary capacity. The seals lie in positions adjacent to one another and both are installed in their actual working condition. Ideally, the secondary seal automatically performs its sealing function as soon as there is primary seal failure. This technique has several important disadvantages, as follows:

a. Both seals are constantly under stress in that they have been compressed within or stretched over a supporting ring.

b. The location of the secondary seal relative to the primary seal is such that primary failure need not be evident as the secondary seal will tend to disguise a primary leakage, being normally located on the dry side of the unit.

c. If the primary seal is functioning correctly the secondary seal can be working in undesirably dry conditions, which may result in it becoming worn out before commencing operation.

According to the present invention, a replacement or standby seal is located within the unit on the 'wet' side of the primary seal. This differs from the arrangement previously described in that the standby seal, although adjacent to the working seal, is only stored within the unit and is, indeed, stored in good conditions within the 'wet' region.

Preferably, the standby seal is unstressed. By this we mean that it is neither compressed within nor stretched over a supporting ring. This permits the use of polytetrafluorethylene and other low stretch materials without introducing difficulties arising from slow recovery characteristics.

Because of its location relative to the primary seal, i.e., on the wet side side the unit, the standby seal does not disguise any leakage or failure of the primary seal, nor will it be worn out before functioning as can be the case with the previous arrangement. The fact that the standby seal may be in rubbing contact with a sliding tube of the unit is not in itself detrimental as the seal material is unstressed and can be subjected in this way to a desirable 'running in' process before being required to function. This is particularly advantageous with polytetrafluorethylene or other relatively hard sealing surfaces.

The ability to store replacement seals within a hydraulic unit is of great benefit when that unit could be working in areas lacking in comprehensive stores. In the case of an aircraft operating from a remote airfield, for example, a fairly rapid replacement can be made without the aircraft becoming unserviceable and this could apply to any piece of hydraulic equipment employing similar methods.

One arrangement in accordance with the invention will now be described by way of example. Reference will be made to the accompanying drawing which represents the lower portion of an aircraft 'oleo' undercarriage leg and is a side elevation sectioned to disclose the seal gland installation.

A wheel axle 1 is united as part of an overall machined member to a sliding tube 2. This tube forms the inner sleeve of the undercarriage leg and moves along its longitudinal axis within the undercarriage leg cylinder 3. The leg cylinder 3 is enlarged in diameter at its lower end region to form a seal chamber 4 and has, at its extreme lower end, an attachment flange ring 5. Secured to this flange 5 by a ring of bolts is the seal gland assembly, comprising a machined ring 6 having an axial flange formed with an external recess to accommodate a seal ring 10 and housing the main seal assembly 9. Additionally, there is a lower machined ring 7, recessed adjacent to the sliding tube 2 to retain a scraper ring 8 when the gland is assembled.

In the assembled condition the main (or primary) seal assembly 9 is compressed between the axial flange of the ring 6 and the sliding tube 2. The seal ring 10 prevents the seepage of fluid through the bolted joint.

The standby seal assembly 11 is disposed within the seal chamber 4 on the 'wet' side of the main seal 9. It is shown uncompressed, with a nominal clearance 12 between itself and the sliding tube 2, and it is separated from the main seal assembly 9 by a split ring 14 that is, in turn, located by a spacer ring 13 encircling the standby seal assembly. The spacer 13 is channelled to provide a leakage path allowing the passage of fluid to the main seal assembly past the standby seal.

In order to replace seals the aircraft is jacked up and the oleo leg deflated. The ring of bolts connecting the seal gland assembly to the undercarriage leg is removed and the whole seal gland assembly is withdrawn and moved down along the sliding tube to disclose both seals. The defective main seal 9 is cut away, the split ring 14 removed and the standby seal 11 assembled in place of the defective element. The split ring 14 is then repositioned leaving the standby seal space empty. The whole assembly is then refitted to the leg cylinder 3.

During this operation fluid loss from the leg will be small because of the provision of a close fitting bush 15 between the leg cylinder 3 and sliding tube 2 just above the seal assembly. This bush may be supplemented by a piston ring type of oil barrier, if desired.

The insertion of another standby seal into the storage space can be performed at the next convenient service time. The method is particularly applicable to an aircraft hydraulic installation but it can equally be applied to any commercial hydraulic equipment functioning in a like manner.

1. A sealing gland of an hydraulic unit, comprising an outer tube having a normal diameter portion, an inner member sliding telescopically within said outer tube, an annular seal chamber formed around the inner member by an enlarged diameter portion at one end of the outer tube a shoulder being defined between said normal and enlarged diameter portions, a primary working seal housed in said seal chamber to prevent egress of hydraulic fluid through said end of the outer tube from the annular space between said inner member and outer tube, a replacement seal likewise housed in said seal chamber, the primary and replacement seals being disposed alongside one another with the primary seal located nearer said end of the outer tube so that the replacement seal is wetted by the hydraulic fluid, and means compressing only the primary seal radially into sealing engagement with said inner member, the replacement seal being in substantial rubbing contact with said inner member and being substantially unstressed.

2. A sealing gland according to claim 1, wherein on the side of the replacement seal opposite to the primary seal a close fitting bush is provided between the inner member and the normal diameter portion of the outer tube to minimize leakage when the gland is opened for removal of the primary seal and fitting of the replacement seal in its place.

3. A sealing gland according to claim 1, wherein the replacement seal is situated between the primary seal and a radial end wall of the seal chamber provided by the shoulder where the normal and enlarged diameter portions of the outer tube meet, and the two seals are separated from one another by an annular member, such as a split ring, removably fitted within the seal chamber.

4. A sealing gland according to claim 3, wherein said annular member is spaced from said end wall of the seal chamber by a spacer ring encircling the replacement seal, which spacer ring is channelled to allow the axial passage of fluid to the primary seal.

5. A sealing gland according to claim 1, wherein said compressing means comprises a gland ring secured to said end of the outer tube and having a flange extending axially into the seal chamber between the primary seal and said enlarged diameter portion of the outer tube.

6. A sealing gland according to claim 5, wherein an auxiliary seal ring is provided between the flange on the gland ring and the surrounding wall of the seal chamber.

7. A sealing gland according to claim 5, wherein a scraper ring engages the inner member on the side of the primary seal opposite to the replacement seal, which scraper ring is carried by the gland ring.

8. A sealing gland of an hydraulic unit, comprising inner and outer telescopically sliding members, the outer member being in the form of a tube, enclosure means provided at one end of a first one of said inner and outer telescopically sliding members and defining together with the second one of said telescopically sliding members on annular seal chamber, a primary working seal housed in said seal chamber, a replacement seal likewise housed in said seal chamber alongside said primary seal, the primary seal being located between said replacement seal and said one end of said first one of said telescopically sliding members, and means stressing only said primary seal thereby pressing it radially into sealing engagement with the second one of said telescopically sliding members, the replacement seal being substantially unstressed.

* * * * *